(12) United States Patent
Abiri et al.

(10) Patent No.: US 10,013,433 B2
(45) Date of Patent: Jul. 3, 2018

(54) VIRTUAL FILE SYSTEM

(71) Applicant: CANON KABUSHIKI KAISHA, Tokyo (JP)

(72) Inventors: Ahmad Abiri, Irvine, CA (US); Quentin Dietz, Irvine, CA (US)

(73) Assignee: CANON KABUSHIKI KAISHA, Tokyo (JP)

( * ) Notice: Subject to any disclaimer, the term of this patent is extended or adjusted under 35 U.S.C. 154(b) by 435 days.

(21) Appl. No.: 14/630,162

(22) Filed: Feb. 24, 2015

(65) Prior Publication Data

US 2016/0246816 A1    Aug. 25, 2016

(51) Int. Cl.
*G06F 17/30* (2006.01)

(52) U.S. Cl.
CPC .. *G06F 17/30235* (2013.01); *G06F 17/30106* (2013.01); *G06F 17/30964* (2013.01)

(58) Field of Classification Search
CPC ......... G06F 17/30106; G06F 17/30235; G06F 17/30964
See application file for complete search history.

(56) References Cited

U.S. PATENT DOCUMENTS

| | | | |
|---|---|---|---|
| 5,418,888 A * | 5/1995 | Alden .................... | G06N 5/047 706/48 |
| 6,195,650 B1 * | 2/2001 | Gaither ............. | G06F 17/30235 |
| 6,256,633 B1 | 7/2001 | Dharap | |
| 7,073,129 B1 | 7/2006 | Robarts et al. | |
| 7,984,035 B2 | 7/2011 | Levin et al. | |
| 8,229,909 B2 | 7/2012 | Wang et al. | |
| 8,326,831 B1 | 12/2012 | Aguera y Arcas et al. | |
| 8,516,023 B1 | 8/2013 | Cherukuri et al. | |
| 8,600,926 B2 | 12/2013 | Flinn et al. | |
| 8,762,374 B1 * | 6/2014 | Chen ................. | G06F 17/30864 707/733 |
| 9,442,850 B1 * | 9/2016 | Rangarajan ......... | H04L 67/2847 |
| 9,449,080 B1 * | 9/2016 | Zhang ............... | G06F 17/30657 |
| 2003/0033287 A1 * | 2/2003 | Shanahan ......... | G06F 17/30011 |
| 2004/0093321 A1 * | 5/2004 | Roustant ........... | G06F 17/30867 |

(Continued)

OTHER PUBLICATIONS

X1 Rapid Discovery Product Brief, "Rapid Discovery, eDiscovery Support for SharePoint", X1.com., 2014.

(Continued)

*Primary Examiner* — Jorge A Casanova
(74) *Attorney, Agent, or Firm* — Fitzpatrick, Cella, Harper & Scinto

(57) ABSTRACT

A virtual file system is provided. Results are received of a first search for files related to current context of a user of the virtual file system, the files being stored on physical media and/or other virtual file systems. The results of the first search are organized into contextually significant virtual folders of the virtual file system. A first entry is recorded into a history of path mappings which map location of the files in the virtual folders to locations of the files on the physical media. Results are received of a second search for files related to an updated context of the user of the virtual file system. The organization of contextually significant virtual folders is updated based on the results of the second search, and a second entry is recorded into the history of path mappings based on the updated organization.

4 Claims, 11 Drawing Sheets

(56) References Cited

U.S. PATENT DOCUMENTS

| | | | | |
|---|---|---|---|---|
| 2004/0205448 | A1* | 10/2004 | Grefenstette | G06F 17/30867 715/230 |
| 2006/0036568 | A1 | 2/2006 | Moore et al. | |
| 2007/0050727 | A1* | 3/2007 | Lewis-Bowen | G06F 9/4443 715/779 |
| 2007/0067217 | A1 | 3/2007 | Schachter et al. | |
| 2008/0243787 | A1* | 10/2008 | Stading | G06F 17/30864 |
| 2008/0306908 | A1* | 12/2008 | Agrawal | G06F 17/278 |
| 2009/0031239 | A1* | 1/2009 | Coleran | G06F 17/30994 715/771 |
| 2009/0089395 | A1* | 4/2009 | Fen | G06F 15/16 709/216 |
| 2009/0150806 | A1 | 6/2009 | Evje et al. | |
| 2010/0005087 | A1 | 1/2010 | Basco et al. | |
| 2010/0094822 | A1 | 4/2010 | Kelapure | |
| 2011/0082848 | A1* | 4/2011 | Goldentouch | G06F 17/30867 707/706 |
| 2011/0197166 | A1 | 8/2011 | Girgensohn et al. | |
| 2013/0297720 | A1 | 11/2013 | Chen et al. | |
| 2015/0067005 | A1* | 3/2015 | Avati | G06F 17/30203 707/827 |
| 2016/0188581 | A1* | 6/2016 | Kidron | G06F 17/30997 707/722 |

OTHER PUBLICATIONS

X1 Rapid Discovery Product Brief, "Transforming eDiscovery & Enterprise Search", X1.com., 2014.
John Patzakis, et al., "eDiscovery and Search Challenges in the De-Centralized Global Enterprise", X1. com., 2014.
X1 Rapid Discovery Product Brief, "Transforming Enterprise Search with an Intuitive and Very Easy to Manage Solution", X1.com., 2014.
Barry Murphy, "Addressing Government Agencies' eDiscovery and Search Challenges", White Paper, X1 Discovery, Inc. 2014.
John Patzakis, et al., "eDiscovery and Search of Enterprise Data in the Cloud; From Hype to Reality", X1 & LTech, accessed Apr. 2014.
Stephen E. Arnold, "Cutting Big Data Down to Size: The PolySpot Solution", ArnoldIT.com, pp. 2-10, Feb. 8, 2012.
Oliver Lefassy, "How Agile Enterprise Search Infrastructure Can Help CIOs", PolySpot, pp. 1-5, Apr. 2012.
IP.com, "Automated File Structuring Suggestion & Implementation System", http://priorart.ip.com/IPCOM/000216074, Mar. 22, 2012.
IP.com, "User Interface for Finding Related Documents in an Activity-centric Environment", http://priorart.ip.com/IPCOM/000137066, Jun. 7, 2006.
IP.com, "Dynamic Aggregation of Contextual Information and Collaborative Practices over Keywords within a Content in an Application Window", http://priorart.ip.com/IPCOM/000198784, Aug. 16, 2010.
Craig Soules, et al., "Why can't I find my files? New methods for automating attribute assignment", Carnegie Mellon University, http://www/usenix.org/legacy/publications/library/proceedings/hotos03/tech/full)_papers, pp. 1-10, May 2003.
Vishnu Challlam, et al., "Contextual Search Using Ontology-Based User Profiles", 2007.
http:/www.polyspot.com/en/products/polyspot-enterprise-search.html, "PolySpot Enterprise Search; A single point of access to all information", 2013.
http://www.x1.com/products, "X1 Product Suite", accessed Apr. 2015.
Krempels, et al., "Context Aware Document Management Systems", http://www.teco.edu/conf/cosdeo2011/ Presentations, 2011.
Pelleg, et al., "X-means: Extending K-means with Efficient Estimation of the Number of Clusters", http://www.aladdin.cs.cmu.edu/papers/pdfs/y2000/xmeans.pdf, 2000.
IP.com, "Method and System for Contextually Aggregating, Organizing and Retrieving Adhoc Interaction Contents Related to Documents", https://priorart.ip.com/IPCOM/000190264, Nov. 23, 2009.
Sieg, et al. "Inferring User's Information Context: Integrating User Profiles and Concept Hierarchies", 2004.
Brown, et al., "Exploiting Contextual Change in Context-Aware Retrieval", 2002.
Tamine-Lechani, et al. "Personalized document ranking: Exploiting evidence from multiple user interests for profiling and retrieval", Journal of Digital Information Management, vol. 6, No. 5, pp. 354-365, Oct. 2008.

* cited by examiner

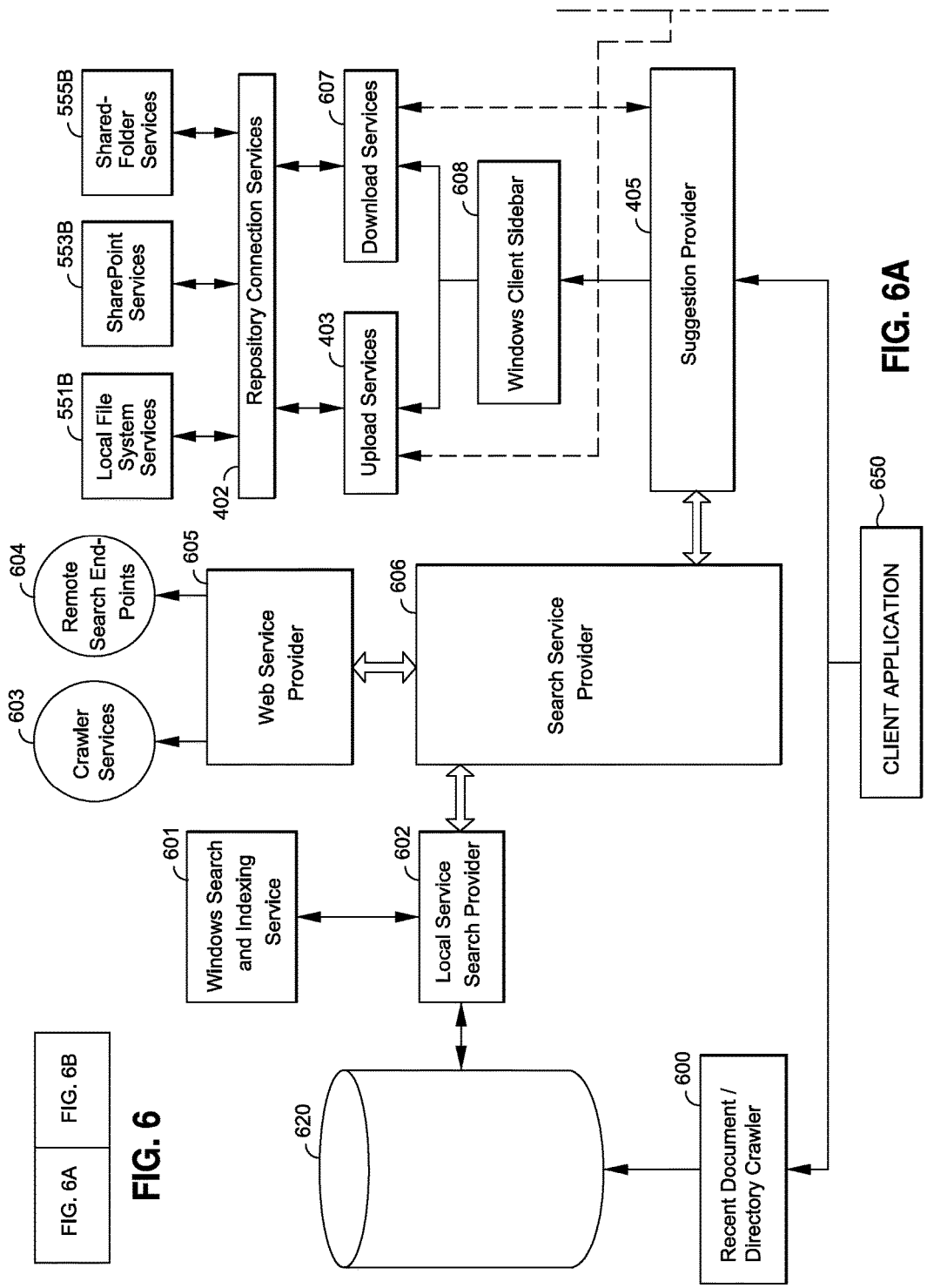

VIRTUAL FILE SYSTEM

FIELD

The present disclosure relates to a virtual file system, and more particularly relates to organizing and updating a virtual file system.

BACKGROUND

In the field of file management, it is common to provide a virtual file system. A virtual file system is an abstract interface to another file system or systems. For example, a virtual file system may provide an interface for client applications to access physical files at multiple different physical locations.

SUMMARY

One difficulty with conventional virtual file systems is that locating files requires search queries to be made to each system individually as requested, making the search process time consuming. This problem is exacerbated with the growing popularity of cloud storage systems, as the number of repositories for files continues to grow. Moreover, because of the scale of such storage, it is often difficult for users to find relevant documents. For example, a virtual file system may represent thousands (or millions) of files in hundreds of places, without providing any insight to the user as to how to reach desired or relevant files, much less to account for changing locations or information of such files over time (i.e., if a file is saved in a different location).

The foregoing situation is addressed by providing a virtual file system which generates and updates virtual files and directories based on current context of a user, while maintaining updated mappings to the corresponding physical files. A current context of the user may, for example, refer to user behavior such as applications, files or folders opened by the user, or search terms entered by the user or the order in which a user accesses files. Moreover, searching for files and folders related to the current context of the user is performed continuously and automatically.

Thus, in an example embodiment described herein relative to a virtual file system, results are received of a first search for files related to current context of a user of the virtual file system, the files being stored on physical media and/or other virtual file systems. The results of the first search are organized into contextually significant virtual folders of the virtual file system. A first entry is recorded into a history of path mappings which map location of the files in the virtual folders to locations of the files on the physical media. Results are received of a second search for files related to an updated context of the user of the virtual file system. The organization of contextually significant virtual folders is updated based on the results of the second search, and a second entry is recorded into the history of path mappings based on the updated organization.

In one aspect, the current context of the user includes at least system state and at least user behavior correlated over time. For example, the system state may include applications, files or folders opened by the user. The current context of the user may also include search terms entered by the user or the order in which a user accesses files.

By providing a virtual file system which generates and updates virtual files and directories based on current context of a user while maintaining updated mappings to the corresponding physical files, it is ordinarily possible to improve the user experience by recommending or providing relevant virtual directories and files, while at the same time allowing faster access to the corresponding physical files.

In one example aspect, a request is received to open a selected file from a virtual folder, and the path of the selected file is resolved to a physical location of a target file on a physical medium, by reference to an entry in the recorded history of path mappings corresponding to a time when the file open request was received.

In another example aspect, an open-close cycle for a file is addressed. Based on the virtual file system, a target file is opened from the physical location on the physical medium. A request is thereafter received to close the opened file. The path of the opened file is resolved to a physical location of a target file on a physical medium by reference to the entry in the recorded history of path mappings corresponding to a time when the file open request was received, and the target file is closed. In one aspect, closing the target file includes updating the target file with changes made to the opened file.

In another example aspect, each entry in the history of path mappings further includes at least content of opened files, virtual folder structure, and metadata of files in the virtual folders.

In one example aspect, the second search is triggered by a change in current context of the user of the virtual file system that exceeds a predetermined threshold. In another example aspect, the second search is triggered periodically after an elapse of a predetermined interval. In still another example aspect, the second search is triggered by the first to occur of a change in current context of the user of the virtual file system that exceeds a predetermined threshold and an elapse of a predetermined interval.

In another example embodiment described herein relative to a virtual file system, current context of a user of the virtual file system is monitored. The current context of the user includes at least system state and at least user behavior correlated over time. Files stored on physical media and/or other virtual file systems and related to a current context of the user of the virtual file system are searched for. The results of the search are organized into contextually significant virtual folders in the virtual file system. The virtual folders are displayed for manipulation by the user of the virtual file system.

By monitoring a current context of a user and providing contextually significant virtual folders, it is ordinarily possible to provide relevant file and folder suggestions to a user, and to thereby increase the user's efficiency and convenience.

In one example aspect, the search is performed across multiple remote repositories of physical media. In a further example aspect, a cache is maintained. The cache stores copies of physical files listed in the virtual folders linked to virtual paths for the virtual folders.

In another example aspect, the search is triggered by a change in current context of the user of the virtual file system that exceeds a predetermined threshold. In another example aspect, the search is triggered periodically after an elapse of a predetermined interval. In still another example aspect, the search is triggered by the first to occur of a change in current context of the user of the virtual file system that exceeds a predetermined threshold and an elapse of a predetermined interval.

In another example embodiment described herein relative to a virtual file system, results are received of a first search for files related to a current context of a user of the virtual file system, the files being stored on physical media and/or other virtual file systems. The results of the first search are organized into contextually significant virtual folders in the virtual file system. Responsive to selection of a virtual folder in the virtual file system, a list of files organized in the selected virtual folder according to the first search is displayed. Responsive to selection of a root directory in the virtual file system, results are obtained of a second search for files related to an updated context of the user of the virtual file system, the organization of contextually significant virtual folders is updated, and the updated organization of virtual folders is displayed.

By treating root directories differently in the virtual file system, it is ordinarily possible to incorporate file or folder suggestions to the user based on the root directory, while allowing the remaining virtual directories to map to actual file(s) on physical media and/or other virtual file systems.

In one example aspect, responsive to selection of a virtual folder, path mappings are resolved, of physical locations on the physical media to virtual files in the selected virtual folder, and a list is retrieved of virtual files and virtual folders contained in the selected virtual folder.

In another example aspect, a request is received to open a selected file listed in a virtual folder. The contents of the virtual file are modified to add application-level attributes including information for mapping of the virtual file to a physical location on a physical medium, and the modified file is opened. In yet another example aspect, a request is received to close the opened file. The application-level attributes added to the virtual file are extracted, including the physical path. The target file mapped by the path mapping is updated so as to include updates to the opened virtual file, and the virtual file is closed.

In one example aspect, the second search is also triggered by a change in current context of the user of the virtual file system that exceeds a predetermined threshold. In another example aspect, the second search is also triggered periodically after an elapse of a predetermined interval. In still another example aspect, the second search is also triggered by the first to occur of a change in current context of the user of the virtual file system that exceeds a predetermined threshold and an elapse of a predetermined interval.

This brief summary has been provided so that the nature of this disclosure may be understood quickly. A more complete understanding can be obtained by reference to the following detailed description and to the attached drawings.

BRIEF DESCRIPTION OF THE DRAWINGS

FIG. 6, comprising FIG. 6A and FIG. 6B, is a block diagram illustrating an example system architecture for a virtual file system according to an example embodiment.

DETAILED DESCRIPTION

Figure 1:
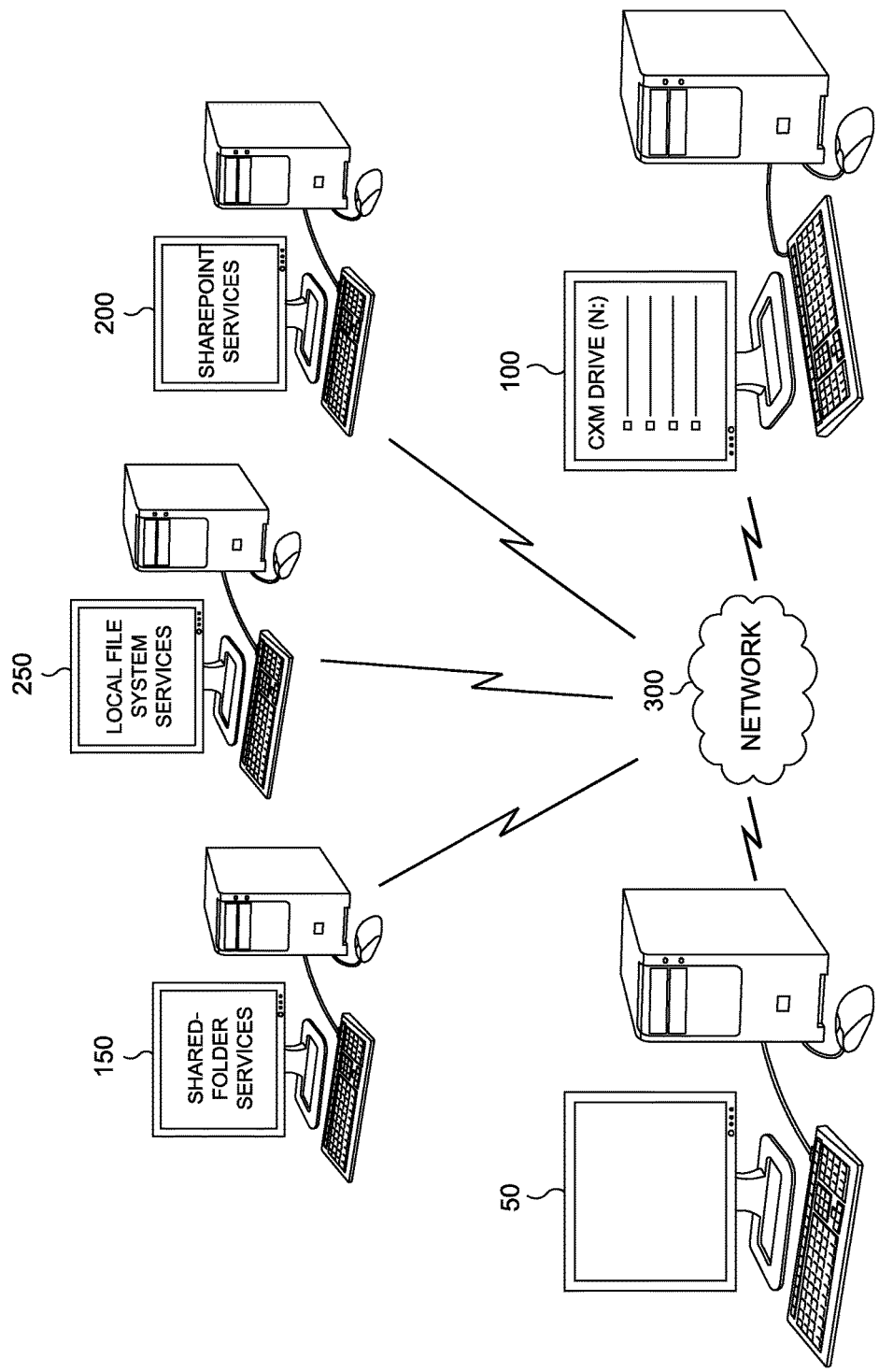
FIG. 1 illustrates an example environment in which aspects of the present disclosure may be practiced.

As shown in FIG. 1, computers 50, 100, 150, 200 and 250 are computers connected across a network. While five computers are shown in FIG. 1 for purposes of simplicity, it should be understood that the number of computers and/or devices on the network may be any number. Moreover, while FIG. 1 depicts a computers 50, 100, 150, 200 and 250 as desktop computers, it should be understood that computing equipment or devices for practicing aspects of the present disclosure can be implemented in a variety of embodiments, such as a laptop, mobile phone, ultra-mobile computer, portable media player, game console, personal device assistant (PDA), netbook, or set-top box, among many others.

Each of computers 50, 100, 150, 200 and 250 generally comprise a programmable general purpose personal computer having an operating system, such as Microsoft® Windows® or Apple® Mac OS® or LINUX, and which is programmed as described below so as to perform particular functions and, in effect, become a special purpose computer when performing these functions.

Each of computers 50, 100, 150, 200 and 250 includes computer-readable memory media, such as fixed disk 45 (shown in FIG. 2), which is constructed to store computer-readable information, such as computer-executable process steps or a computer-executable program for causing the computer to perform a method for providing a virtual file system, as described more fully below.

As shown in FIG. 1, computer 100 presents a virtual file drive (N:\) of a virtual file system to the user. The virtual file system/drive simulates physical files stored on other repositories (e.g., computers 50, 150, 200 and 250) as files which are stored and accessible locally. For example, as shown in FIG. 1, computer 150 is a shared-folder repository, computer 200 is a SharePoint repository, and computer 250 is a local file system repository, but the files stored therein are shown virtual file drive N:\ on computer 100 as if they were stored locally. Of course, other types and numbers of repositories are possible.

As a user performs actions on computer 100 such as entering search terms or opening files, the virtual file system described herein also performs an automatic search for related files and folders and displays them as shown in FIG. 1. Of course, the display in FIG. 1 is only an example, and numerous different types of display of files and folders are possible.

Network 300 transmits data between computers 50, 100, 150, 200 and 250. The implementation, scale and hardware of network 300 may vary according to different embodiments. Thus, for example, network 300 could be the Internet, a Local Area Network (LAN), Wide Area Network (WAN), Metropolitan Area Network (MAN), or Personal Area Network (PAN), among others. Network 300 can be wired or wireless, and can be implemented, for example, as an Optical fiber, Ethernet, or Wireless LAN network. In addition, the network topology of network 300 may vary.

Figure 2:
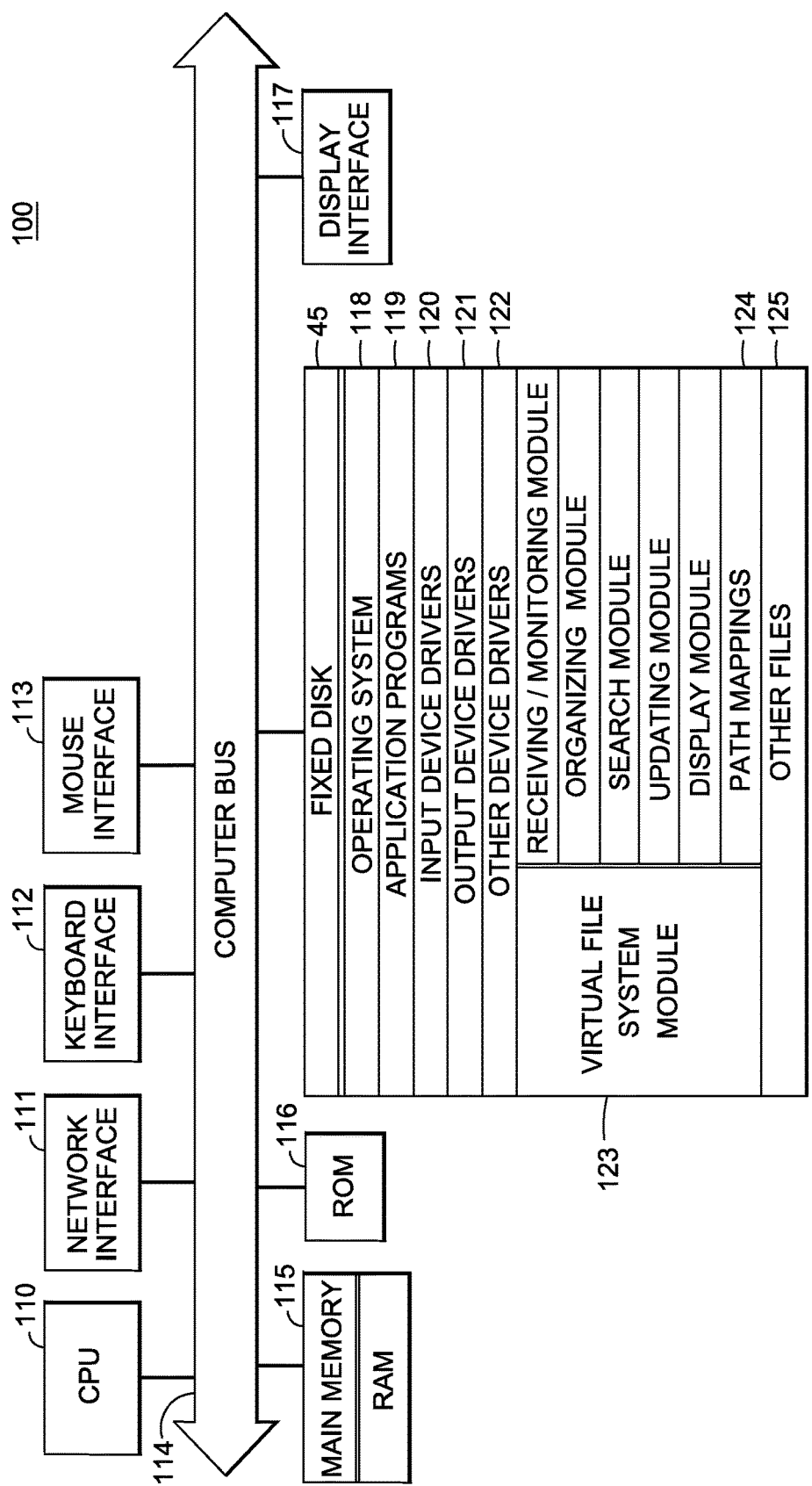
FIG. 2 is a detailed block diagram depicting an example of the internal architecture of each of the computers shown in FIG. 1 according to an example embodiment.

FIG. 2 is a detailed block diagram depicting an example of the internal architecture of computer 100 shown in FIG. 1 according to an example embodiment. For purposes of conciseness, only the internal architecture of computer 100 is described below, but it should be understood that other computers 50, 150, 200 and 250 or other devices may include similar components, albeit perhaps with differing capabilities.

As shown in FIG. 2, computer 100 includes central processing unit (CPU) 110 which interfaces with computer bus 114. Also interfacing with computer bus 114 are fixed disk 45 (e.g., a hard disk or other nonvolatile storage medium), network interface 111 for accessing other devices across network 300, keyboard interface 112, mouse interface 113, random access memory (RAM) 115 for use as a main run-time transient memory, read only memory (ROM) 116, and display interface 117 for a display screen or other output.

RAM 115 interfaces with computer bus 114 so as to provide information stored in RAM 115 to CPU 110 during execution of the instructions in software programs, such as an operating system, application programs, and device drivers. More specifically, CPU 110 first loads computer-executable process steps from fixed disk 45, or another storage device into a region of RAM 115. CPU 110 can then execute the stored process steps from RAM 115 in order to execute the loaded computer-executable process steps. Data, such as messages received on network 300, or other information, can be stored in RAM 115 so that the data can be accessed by CPU 110 during the execution of the computer-executable software programs, to the extent that such software programs have a need to access and/or modify the data.

As also shown in FIG. 2, fixed disk 45 contains computer-executable process steps for operating system 118, and application programs 119, such as display programs. Fixed disk 45 also contains computer-executable process steps for device drivers for software interface to devices, such as input device drivers 120, output device drivers 121, and other device drivers 122. Other files 125 are available for output to output devices and for manipulation by application programs.

Virtual file system module 123 comprises computer-executable process steps for providing a virtual file system, and generally comprises a receiving/monitoring module, an organizing module, a search module, an updating module and a display module. More specifically, virtual file system module 123 is configured to provide a virtual file system which generates and updates virtual files and directories based on current context of a user, while maintaining updated mappings to the corresponding physical files. Moreover, virtual file system module 123 is configured to monitor a current context of a user and providing contextually significant virtual folders, to provide relevant file and folder suggestions to a user. In addition, virtual file system module 123 is configured to treat root directories differently in the virtual file system, and to incorporate file or folder suggestions to the user based on the root directory, while allowing the remaining virtual directories to map to actual file(s) on physical media and/or other virtual file systems. Virtual file system module 123 may also store path mappings 124, which includes a history of mappings from locations of files in virtual file folders to locations of files on physical media. These processes will be described in more detail below.

The computer-executable process steps for virtual file system module 123 may be configured as part of operating system 119, as part of an output device driver, such as a router driver, or as a stand-alone application program. Collaborative network defense module 123 may also be configured as a plug-in or dynamic link library (DLL) to the operating system, device driver or application program. It can be appreciated that the present disclosure is not limited to these embodiments and that the disclosed modules may be used in other environments.

Figure 3:
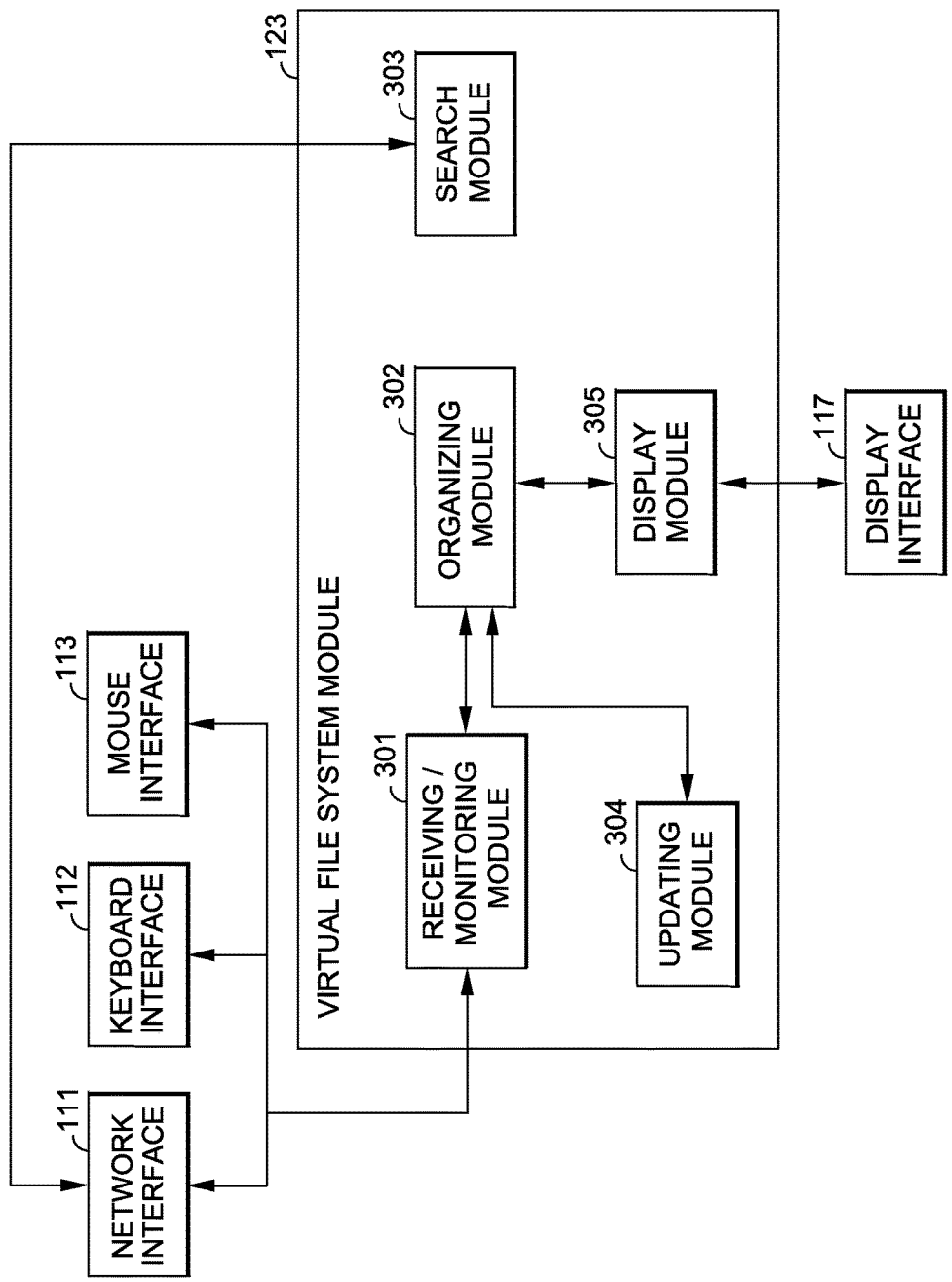
FIG. 3 illustrates a virtual file system module according to an example embodiment.

FIG. 3 illustrates a virtual file system module 123 according to an example embodiment.

In particular, FIG. 3 illustrates an example architecture of virtual file system module 123 in which the sub-modules of virtual file system module 123 are included in fixed disk 45. Each of the sub-modules are computer-executable software code or process steps executable by a processor, such as CPU 110, and are stored on a computer-readable storage medium, such as fixed disk 45 or RAM 115. More or less modules may be used, and other architectures are possible.

As shown in FIG. 3, virtual file system module 123 includes receiving/monitoring module 301 for receiving results of a first search for files related to a current context of a user of the virtual file system, the files being stored on physical media and/or other virtual file systems. Receiving/monitoring module 301 is also for monitoring current context of a user of the virtual file system, wherein current context of the user includes at least system state and at least user behavior correlated over time. To that end, receiving/monitoring module 301 communicates with network interface 11, keyboard interface 112, and mouse interface 113. Receiving/monitoring module 301 also receives results of a second search for files related to an updated context of the user of the virtual file system.

Receiving/monitoring module 301 also communicates with organizing module 302, which is for organizing the results of a search (e.g., the results received from the first search mentioned above) into contextually significant virtual folders of the virtual file system. Organizing module 302 also records a first entry into a history of path mappings (e.g., path mappings 124) which map location of the files in the virtual folders to locations of the files on the physical media. Search module 303 is for searching for files related to a current context of the user of the virtual file system, the files being stored on physical media and/or other virtual file systems. To that end, search module 303 is connected to network interface 111. Updating module 304 is for updating the organization of contextually significant virtual folders based on the results of the second search and recording a second entry into the history of path mappings based on the updated organization. Thus, updating module communicates with organizing module 302.

Display module 305 is for displaying the virtual folders for manipulation by the user of the virtual file system, and communicates with display interface 117. Display module 305 may, responsive to selection of a virtual folder in the virtual file system, display a list of files organized in the selected virtual folder according to the search.

Responsive to selection of a root directory in the virtual file system, receiving/monitoring module 301 may also receive results of a second search for files related to an updated context of the user of the virtual file system, updating module 304 may update the organization of contextually significant virtual folders, and display module 305 may display the updated organization of virtual folders. Each of these processes will be described more fully below.

Figure 4:
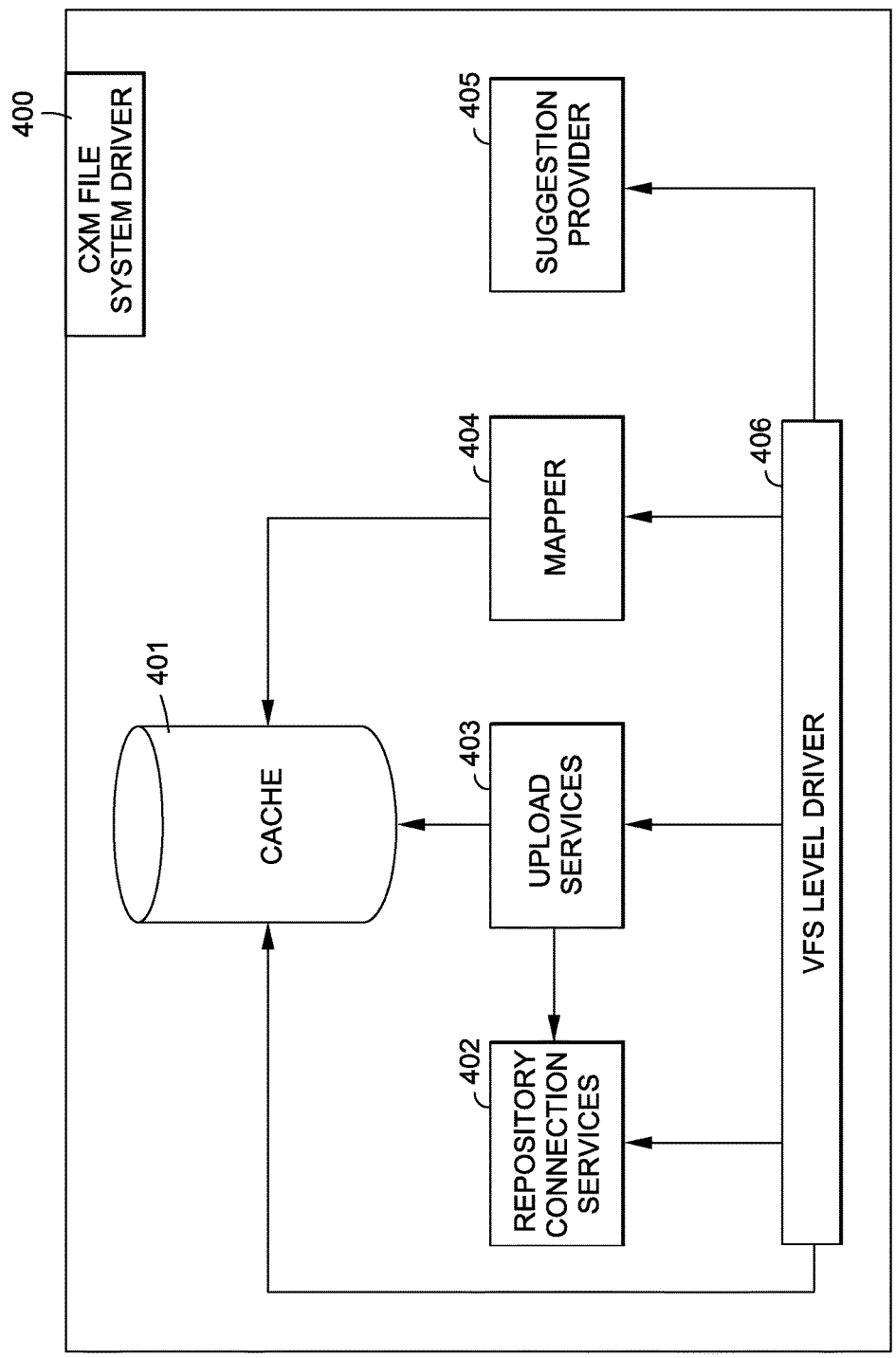
FIG. 4 depicts a context management file system driver for implementing a virtual file system according to an example embodiment.

FIG. 4 depicts a context management (hereafter CXM) file system driver 400 for implementing a virtual file system according to an example embodiment. In some example embodiments, aspects of CXM file system driver 400 may correspond to one or more aspects of virtual file system module 123, and may be stored on, e.g., fixed disk 45.

Generally, CXM file system driver 400 simulates virtual files on multiple different computers in a manner in which files on a local hard drive would appear. CXM file system driver 400 thus provides dynamic mapping to documents from a variety of sources, and adjusts for what may be a constantly changing list of files based on the context search.

Thus, in one embodiment, current context of a user of the virtual file system is monitored. The current context of the user includes at least system state and at least user behavior correlated over time. Files stored on physical media and/or other virtual file systems and related to a current context of the user of the virtual file system are searched for. The results of the search are organized into contextually significant virtual folders in the virtual file system. The virtual folders are displayed for manipulation by the user of the virtual file system.

In one aspect, the search for files on physical media and/or other virtual file systems and related to a current context of the user is performed by context management services (hereafter CXM services). Example aspects of CXM services are described in U.S. patent application Ser. No. 14/260,813, filed Apr. 24, 2014, entitled "Devices, Systems, and Methods for Context Management", the contents of which are incorporated by reference herein.

In order to cluster the results, the X-mean algorithm can be used. The X-means algorithm is similar to the k-means algorithm, except that it determines the k automatically. See, for example, Pelleg, et al., "X-means: Extending K-means with Efficient Estimation of the Number of Clusters", 2000. As input to the X-mean algorithm, a document term matrix can be created, where each row is a keyword present in at least one CXM result and each column contains the weight of that keyword as determined by CXM (or 0 if the term is not present). The X-means algorithm will run and divide the results into relevant sets of documents. In one example, for each cluster, the keyword with the highest weight for a cluster becomes the name of the corresponding folder.

In one embodiment, a directory listing performed by CXM file system driver 400 provides the list of virtual files in a similar manner to physical files stored locally. Thus, for example, the user may be provided with a virtual file drive (N:\) and a list of folders and files stored therein, as shown in FIG. 1. The directory listing is updated automatically with relevant files and folders to actions being performed by the user. In one aspect, the current context of the user includes at least system state and at least user behavior correlated over time. For example, the system state may include applications, files or folders opened by the user, and the current context of the user may include search terms entered by the user or the order in which a user accesses files.

CXM file system driver 400 also provides access to the physical files corresponding to the virtual files in the virtual file system. In particular, for every listed file and directory in the directory listing, corresponding virtual files and folders are created. The virtual files and folders are stored in cache 401 shown in FIG. 4, along with a mapping to the physical source file (generated by mapper 404).

In this regard, in some embodiments, a virtual file may comprise only metadata about the physical file and some parts of the physical file (e.g., the cached portions), with more parts of the file being obtained from the physical file as needed. The metadata may include, for example, the location of the physical source file, along with other information such as the last time the physical file was modified. Generally, only parts of the physical file are stored, because downloading and storing each physical file in full would take up significant amounts of time and memory. The virtual folders may comprise only metadata.

To access a physical file, CXM file system driver 400 refers to the virtual file, which includes the data mapping to the source file. In particular, mapper 404 consults the metadata for the virtual file in cache 401 to see where the actual physical file is located. The content may then be retrieved using repository connection services 402, which performs download/upload operations on various local and remote repositories. Repositories can include cloud storage such as Google Drive, Amazon S3, Dropbox, etc., local file storage such as local drives, USB drive, etc., and SharePoint and/or Network Shared drives/folders.

Each of the modules in CXM file system driver 400 will now be described in more detail.

Cache 401 is used to store data for mapper 404, as well as instances of virtual folder and virtual file objects, as discussed above. In one embodiment, cache 401 also includes pieces of all files downloaded. This allows fast access for read/write/seek requests. In one example, cache access to these files is performed using a unique ID associated with each virtual folder and virtual file objects. Operations on any one specific cache item may be atomic (e.g., access from multiple threads is queued and performed one at a time).

The contents of cache 401 are determined by mapper 404, and the mapper 404 can add files to the cache. Cache 401 is generally limited to virtual files, folders and some parts of the physical file. Cache 401 stores copies of physical files listed in the virtual folders linked to virtual paths for the virtual folders.

Thus, for example, a user may instruct to open the virtual (N:\) drive. VFS local driver 406, as discussed below, obtains a root directory listing, and documents for the root directory and relevant to the current context of the system or user are searched for using CXM services, and virtual files are created therefor and placed in cache 401. In one example aspect, the search is performed across multiple remote repositories of physical media. In another example, searching for files and folders related to the current context is performed continuously and automatically, as discussed more fully below.

On the other hand, when a user instructs to open a sub-directory (i.e. not a root directory), repository connection services 402 obtains the physical files corresponding to the virtual files and places them into the cache 401. To that end, cache 401 may also store a mapping table between physical and virtual files.

In more detail, a history of path mappings is maintained at cache 401 by mapper 404. For example, each entry in the history of path mappings may include at least content of opened files, virtual folder structure, and metadata of files in the virtual folders. In particular, the history of path mappings may include all virtual files accessed in a past period of time. Since the cache does not have infinite storage, and to reduce speed and keep the cache consistent (e.g., if two different systems access the virtual file), the history of objects can be time-based. For example, the history of path mappings can store which actual file (corresponding to the virtual file) was presented to the user first, or, which was displayed in the past.

For example, assume a physical file located in two different places. A user opens the virtual drive (N:\), and based on keywords extracted from user activity, CXM services returns a virtual file corresponding to a physical file located in e.g., Dropbox. While updating the physical file (opened via the virtual file), CXM services may continue searching for related files and return a virtual file corresponding to a different physical file, e.g., one located in Sharepoint. Thus, to maintain consistency, the updates must be saved to the same physical file that was opened in the first place. The history of path mappings stores a context by which such changes can be saved to the proper place.

Thus, the path mapping is a map which will relate the virtual file path to the remote location path. For example, a virtual file might be displayed at the following path: N:/project1/report.docx (N:/ drive being the virtual drive), but may actually reside at the physical location www.dropbox.com/user/report"dot"docx. In such a case, the path mapping would contain "V:/project1/report.docx→www.dropbox.com/user/report"dot"docx."

Accordingly, using the history of path mappings, it is ordinarily possible to keep cache 401 consistent with user actions. For example, when a request is received to open a selected file from a virtual folder, the path of the selected file is resolved to a physical location of a target file on a physical medium, by reference to an entry in the recorded history of path mappings corresponding to a time when the file open request was received. Then, the target file is opened from the physical location on the physical medium. When a request is received to close the opened file, the path of the opened file is resolved to a physical location of a target file on a physical medium by reference to the entry in the recorded history of path mappings corresponding to a time when the file open request was received, and the target file is closed. In one aspect, closing the target file includes updating the target file with changes made to the opened file.

Specifically, when opening a file, the CXM file system driver 400 receives a notification from the VFS local driver 406 that a file at a virtual path wants to be opened. This notification contains the path of the virtual file which must be opened. At this moment, the CXM file system driver 400 will look at the history of path mappings to find the remote path corresponding to that virtual file. Once the remote path is obtained, the CXM file system driver 400 will download the file in order to display it to the user.

When closing a file, the CXM file system driver 400 receives a notification from the VFS local driver 406 that a file at a virtual path needs to be closed. That notification contains the path of the virtual file which must be closed as well as the new data that needs to be written to that file. The CXM file system driver 400 will look at the history of path mappings to find the remote path corresponding to that virtual file. Once the remote path is obtained, the CXM file system driver 400 will write the new file data to said remote path.

In some aspects, changes to the virtual file are updated to the physical file via the mapping. For example, a request may be received to open a selected file listed in a virtual folder. The contents of the virtual file are modified to add application-level attributes including information for mapping of the virtual file to a physical location on a physical medium, and the modified file is opened. In yet another example aspect, a request is received to close the opened file. The application-level attributes added to the virtual file are extracted, including the physical path. The target file mapped by the path mapping is updated so as to include updates to the opened virtual file, and the virtual file is closed.

Specifically, when changing a file, the CXM file system driver 400 receives a notification from the VFS local driver 406 that a file at a virtual path needs to be saved. That notification contains the path of the virtual file which must be closed as well as the new data that needs to be written to that file. The CXM file system driver 400 will look at the history of path mappings to find the remote path corresponding to that virtual file. Once the remote path is obtained, the CXM file system driver 400 will write the new file data to the remote path.

Moreover, subsequent (i.e., second or later) searches for content by CXM services can be controlled to manage how often the presented content changes. In that regard, in a context management system, suggestions or relevant files and folders may change all the time. A consequence of providing a virtual file system with context-based search and retrieval (described more fully below) and indirect mapping is that, when context changes often (e.g., with multiple user actions), virtual files may disappear from the view of the operating system often as they become less relevant, and may lead to a system crash if there is an attempt to access.

In contrast, according to the embodiments described herein, virtual files and folders may be maintained in cache 401 longer than they are exposed to the view of the operating system. For example, when an application is open, changes may happen all the time. Nevertheless, CXM file system driver 400 may track, through VFS level driver 406, when requests from an application slow down or stop coming, and then discard the virtual file afterwards. Requests to the file may then be blocked until the file is re-uploaded to cache 401. Or, a search by CXM services to update the virtual directory can be postponed.

On the other hand, searches may also be performed continuously and automatically. For example, the subsequent (e.g., a second) search for new files can be triggered by a change in current context of the user of the virtual file system that exceeds a predetermined threshold. In another example, the subsequent search can be triggered periodically after an elapse of a predetermined interval. In still another example, the subsequent search can triggered by the first to occur of a change in current context of the user of the virtual file system that exceeds a predetermined threshold and an elapse of a predetermined interval.

For example, in one embodiment, receiving module 301 is responsible for monitoring the current context of a user. This current context is the files, folders, and applications opened by the user as well as their Z-ordering (which one is in focus, which one is right behind it, etc. . . . ). A change score will be computed which marks how many things have changed since the last search. For example, a switch in Z-order may increase the change score by 1, a new window opening may change it by 2, a window closing may change it by 3. Of course, these changes in score are simply examples, and changes can be scored or weighted as desired. When the change score reaches a configurable threshold, a new search is made as the context is determined to have changed enough. When a new search is made, the change score is reset back to 0.

As mentioned above, repository connection services 402 performs download/upload operations on various local and remote repositories. Repositories can include cloud storage such as Google Drive, Amazon S3, Dropbox, etc., local file storage such as local drives, USB drive, etc., and SharePoint and/or Network Shared drives/folders.

Upload services 403 monitors a queue of virtual files and/or virtual folders to be uploaded (e.g., to update a virtual file which has become stale), and pulls the necessary virtual files and/or virtual folders from cache 401. In particular, when a physical file is modified, the corresponding virtual file needs to be uploaded back to the cache 401. Not every change is pushed, however. In one embodiment, upload services 403 may determine if the file is to be uploaded by checking if the last access date of the cached item is older than a predetermined interval, such as based on a combination of the time taken to upload the file last time and the interval between each time the file is accessed by the operating system. If it is determined that a file should be uploaded, upload services 403 may place a lock on the file (preventing all read/write/access), and then upload the file using repository connection services 402.

Mapper 404 resolves a relative path of the virtual drive to the actual path pointing to a source physical document or directory. Since the root directory lists documents and folders from different sources, mapper 404 may utilize, e.g., a hash table to keep track of the history of path mappings between virtual paths and the original source object, the hash table/history of path mappings being stored in cache 401 as discussed above. Mapper 404 also keeps a history of previous directory listings. In each directory listing, mapper 404 keeps track of all listed history of path mappings and their corresponding destinations. When a request is made to resolve a path to a non-root directory, mapper 404 looks at the history of path mappings (stored in cache 401) and locates the full path from the virtual path.

Suggestion provider 405 acts as a layer of communication between CXM services and, for example, an application driver which presents the virtual file system to the user. CXM services, as mentioned above, searches for relevant files and folders based on actions of a user. Subsequently, suggestion provider 405 may provide a list of documents/ directories recommended for the user using CXM services. In another example, suggestion provider 405 may list relevant content. For example, given a full target folder path (local or remote), suggestion provider 405 uses CXM services to provide a list of files and folders in the target folder.

Virtual file system (VFS) level driver 406 is responsible for handling operating system requests. These include, file/ folder open, read, write, seek, close, etc. Each incoming request from the operating system (e.g., triggered by another application), includes identifying data about the virtual file or folder being accessed (e.g. file name, desired access).

For example, if a directory listing is requested for a root folder, VFS level driver 406 uses suggestion provider 405 to retrieve new suggested documents/folders for the root folder, and checks with mapper 404 to see if it can resolve the paths to each document/folder. If the paths can be resolved, then the virtual file is retrieved from cache 401. If the paths can not be resolved, VFS level driver 406 creates new virtual file(s), and adds the virtual file to cache 401, and provides relevant information to mapper 404 (e.g., mapper 404 is informed that this is a new directory listing). An enumerable object for the virtual files (e.g, an enumeration ID) is generated to keep track of all enumeration requests following this request.

If, on the other hand, a directory listing is requested for a non-root folder, VFS level driver 406 resolves the actual folder URL (e.g., the actual location of the file) using mapper 404, and uses suggestion provider 405 to retrieve list of file/folders in that directory. For each file/folder retrieved, VFS level driver 406 checks if mapper 404 can resolve the path. If the path can be resolved, then the virtual file or folder is retrieved from the cache 401. If the path can not be resolved, VFS level driver 406 creates a new virtual file, and adds the virtual file to cache 401, and provides relevant information to mapper 404 (e.g., mapper 404 is informed that this is a new directory listing). An enumerable object for the virtual file (e.g., an enumeration ID) is generated to keep track of all enumeration requests following this request.

Thus, the directory listing generated by CXM file system driver 400 treats root directories of the virtual file system and sub-directories of the root directory differently. In particular, the root directory of a virtual file system is used to provide suggestions of virtual files or folders, whereas a non-root directory may map to the actual physical directory where the files are stored.

VFS level driver 406 also provides read, write and seek operations on virtual files. As mentioned above, VFS level driver 406 may resolve an actual file URL (the location of a source file) using mapper 404. Using the URL, VFS level driver 406 may look for instances of the virtual file or folder in cache 401. As mentioned above, VFS level driver 406 may create a new virtual file or folder if the sought-after virtual file or folder cannot be located.

In a read operation, VFS level driver 406 adds the requested virtual items (virtual files or folders) to cache 401, uses repository connection services 402 to update (write to) the cache 401 (asynchronously), and completes the read request as soon as a data chunk of the virtual file or folder is available.

In a seek operation, VFS level driver 406 adds the requested virtual items (virtual files or folders) to cache 401, uses repository connection services 402 to update (write to) the cache 401 (asynchronously), and completes the seek request as soon as a data chunk of the virtual file or folder is available.

In a write operation, VFS level driver 406 seeks to the right address (if needed), writes the data to cache 401, uses upload services 403 to queue modifications for upload, and cache 401 is updated to reflect the last access date of the updated item.

VFS level driver 406 also manages virtual file attributes and properties. For example, VFS level driver 406 resolves an actual file URL using mapper 404, looks for instances of the virtual file or virtual folder in cache 401, pulls file properties, generate and adds attributes (e.g., Original Document Path, Author, etc), and provides this information to the operating system.

VFS level driver 406 also provides cleanup services. Specifically, files that have been closed by the operating system, are not accessed for some time, and have already been uploaded (in the case of modified files only), are automatically removed from cache 401 and mapper 404. In this regard, an operating system may tend to close and re-open files often, therefore, a specified, minimum time is given before the cleanup occurs. This improves conditions where the operating system may attempt to access a file after it has closed it (and requested cleanup).

In addition, if an operating system requests a directory list or files or search folder requests as part of a previous listing (the operating system can make multiple requests for directory listing, each time requesting either a single file with a specified name and extension or a continuation of a previous enumeration/listing), the VFS level driver 406 locates the enumerable files for the listing using an enumeration, returns the objects, and increments the enumeration.

Figure 5A:
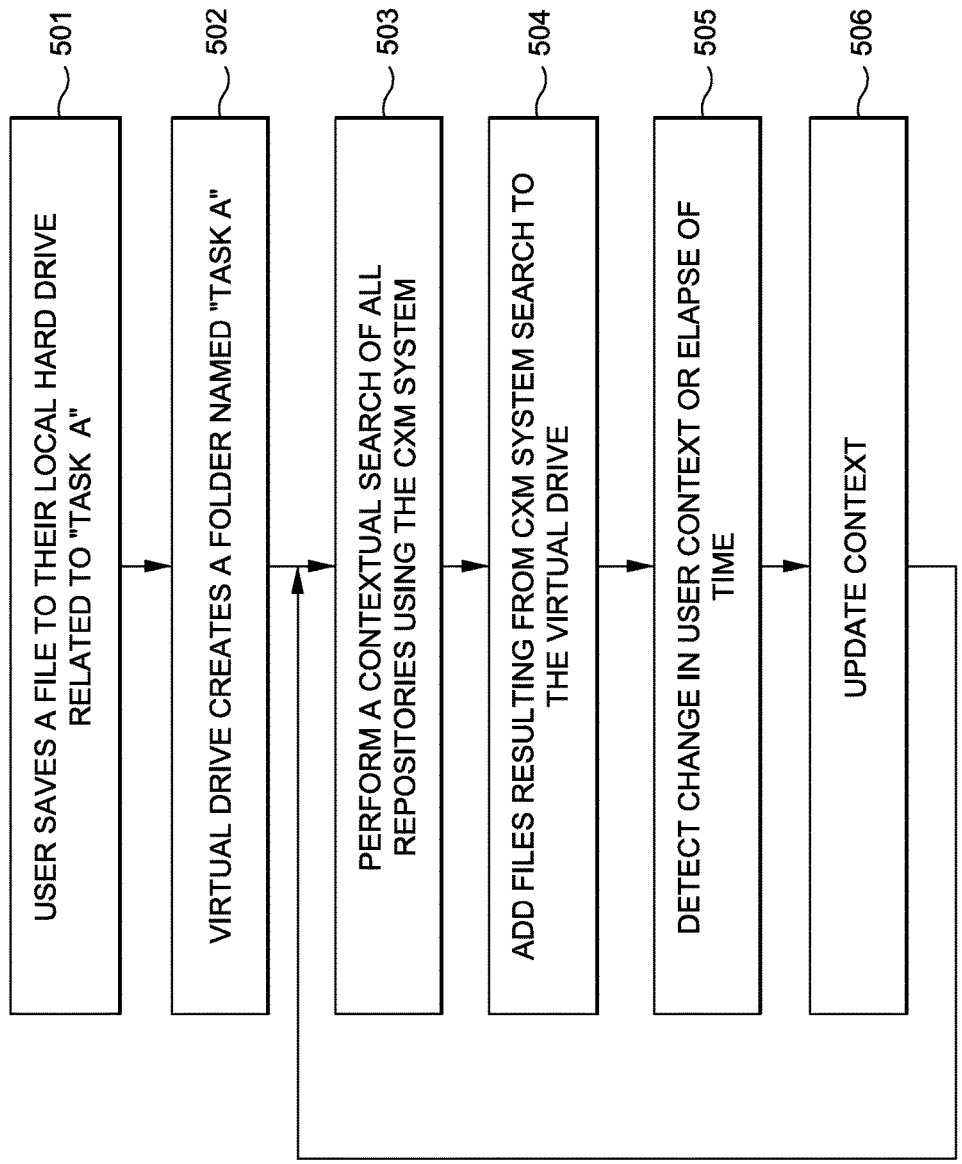
FIG. 5A is a flow diagram illustrating a process for adding one or more files to a virtual drive which are related to user actions.

FIG. 5A is a flow diagram for explaining a CXM system (e.g., CXM services, VFS level driver, sharepoint services, etc.) according to an example embodiment. In that regard, VFS level driver monitors system state and user behavior correlated over time, and CXM services perform context collection. For example, VFS level driver 406 monitors which applications are open, titles of open windows a files, what files applications are accessing, and so on. VFS level driver 406 can then determine which are being accessed the most, and can extract keywords related to those applications/ files/etc. to send as a query to a CXM service, which returns with files and/or related folders. Thus, the CXM service is how relevant documents to user actions are automatically obtained and provided to the user.

Thus, in step 501, a user saves a file to their local hard drive related to "Task A". In step 502, the virtual drive (e.g., via VFS level driver 406) creates a folder named "Task A" corresponding to the user task. In step 503, a contextual search of all repositories on the network (e.g., including other computers on network 300) is performed using the CXM system. In step 504, files resulting from the CXM system search are added to the virtual drive.

Meanwhile, as mentioned above, searching for files and folders related to the current context can be performed continuously and automatically. Thus, the process proceeds to step 505, where a change in user context or an elapse of time is detected, and to step 506, where the context is updated. Thus, searching is updated based on a time-wise change in context. The process then returns to step 503 to continue the automatic context search.

Figure 5B:
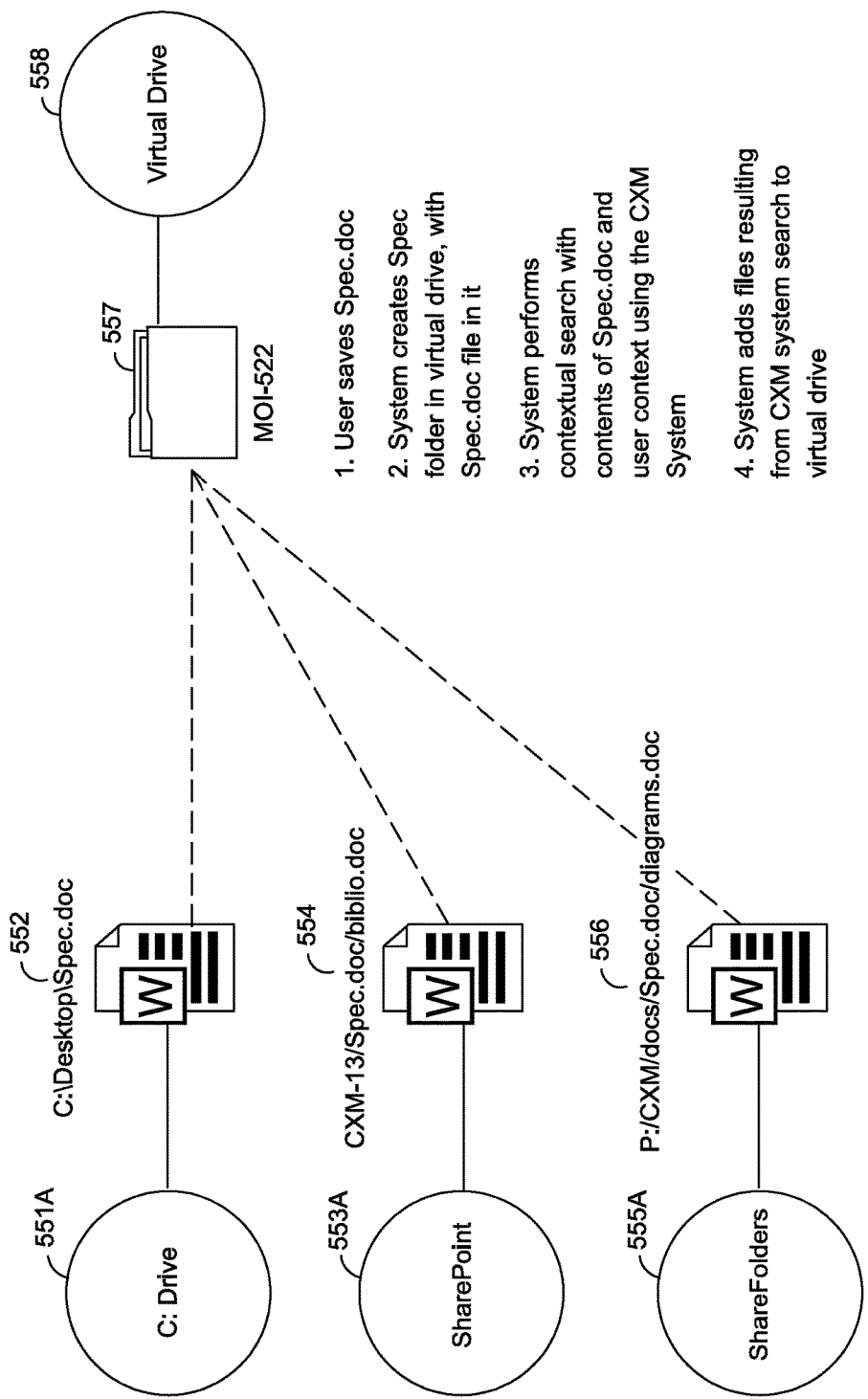
FIG. 5B is a view for illustrating the process for adding one or more files to a virtual drive.

FIG. 5B is a view for illustrating a process for adding one or more files to a virtual drive.

As shown in FIG. 5B, a user may open a Microsoft Word document 552 (spec.doc) from a local drive 551A (C:\Desktop) and save it to the desktop. The virtual drive system creates a folder 557 for this document in the virtual drive 558, and stores the document 552 in the folder 557. A contextual search using the contents of the document 552 and user context is performed using the CXM system, and files resulting from the CXM system search are added to to folder 557. Thus, as shown in FIG. 5B, document 554 (CXM-12/spec/biblio.doc) from SharePoint drive 553A and document 556 (P:/CXM/docs/spec/diagrams.doc) from ShareFolders 555A are retrieved and added to folder 557.

Figure 6B:
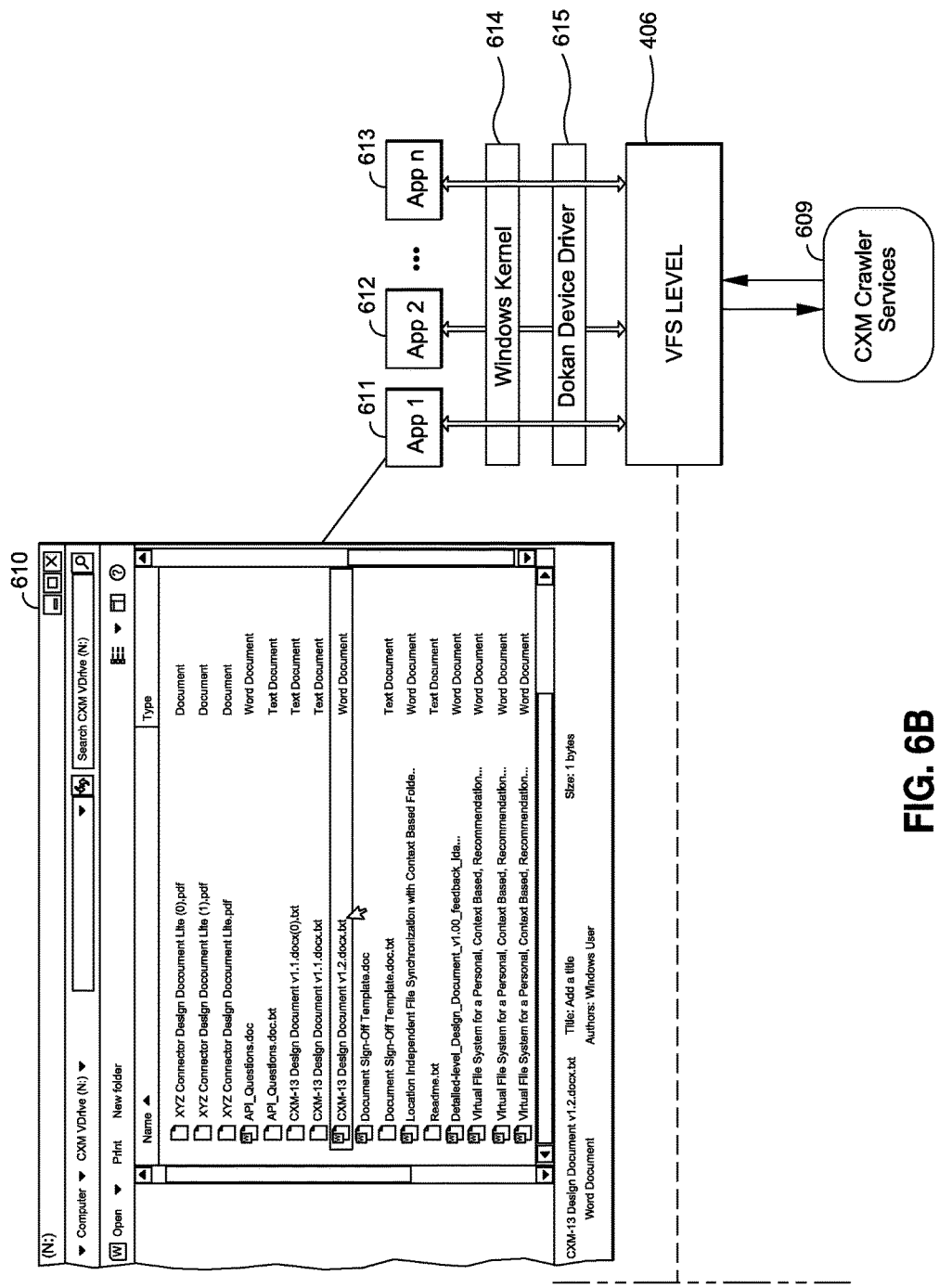

FIG. 6, comprising FIG. 6A and FIG. 6B, is a block diagram illustrating an example system architecture for a virtual file system according to an example embodiment.

In that regard, cache 401, repository connection services 402, upload services 403, mapper 404 (not shown), suggestion provider 405 and VFS level driver 406 are discussed above with respect to FIG. 4, and for purposes of conciseness that description is not repeated in full herein. As mentioned above, repository connection services 402 is component(s) that provides list/download/upload access to various repositories or other CXM components that can provide such functionality, and suggestion provider 405 is connection service to the CXM engine that can provides a list of suggested documents and folders. Suggestion provider 405 also receives keywords from the CXM Engine, which it sends to the search service provider to receive recommendations from a variety of services (e.g., remote search endpoints 604, local service search provider 602).

Recent document/directory crawler 600 receives input from a client application, such as recent documents and directories opened or accessed by the user. The goal of recent document/directory crawler 600 is to understand and index all recent documents/directories a user has worked with. This list of documents/directories is provided by the OS. While crawling, the title of a document as well as some text extracted from the document will be stored in said index.

This index is then searched by the client application 650, using as input the keywords generated by the suggestion provider 405, which returns suggestions and keywords it used to retrieve suggestions. Using, for example, virtual file system (VFS) level driver 406, this information can be added to the cache 620 in the form of metadata.

In that regard, cache 620 is not necessarily the same cache as cache 401. In particular, cache 620 is a recent document/ directory metadata cache. The goal of cache 620 is to save the information collected from the recent document/directory crawler 600 and make it easily searchable. Cache 620 saves, e.g., the title of a document, some text extracted from a document, as well as additional metadata. Local service search provider 602 can then query it in order to get suggestions from recent documents. In one aspect, cache 620 can be helpful in situations where, e.g., recent documents may not all be indexed by the Windows Search and Indexing Service, but can still be very valuable (i.e., when Windows does not index all files).

Windows search and indexing service 601 provides information to the cache 401 acquired when the local service search provider 602 queries the Windows search and indexing service 601. In particular, windows search and indexing service 601 is a component built into Microsoft Windows, and powers local search on a computer. In order to search not only remote repositories but also the local drive, local service search provider 602 will query windows search and indexing service 601 with keywords obtained by local service search provider 602. This will then return local documents relevant to the user's context.

Local service search provider 602 is a component which searches both recent documents accessed by a user on the computer/device, as well as documents indexed by the windows search and indexing service 601. Local service search provider 602 is responsible for merging these results and ordering them by relevance.

Crawler services 603 is a set of application program interfaces (APIs) exposed by the recent document/directory crawler 600 which allows a user to gain additional information regarding a folder. Thus, if a recommendation is close, a user can see surrounding files.

Remote search endpoints 604 allow the clients to search various data sources using the keywords generated by CXM. For example, keywords can be used to search Google or StackOverflow, and bring relevant web pages as results.

Web service provider 605 is a layer which abstracts out the crawler services 603 and remote search endpoints 604. Web service provider 605 can handle multiple remote search endpoints as well as crawler services, and can convert results into a unified format.

Search service provider 606 provides a simple way for the suggestion provider 405 to query multiple services (e.g., remote search endpoints 604, local service search provider 602) and to receive results in a standard format. Thus, suggestion provider 405 uses the information in search service provider 606 to provide a suggestion to the client application 650.

As mentioned above, repository connection services 402 is component(s) that provides list/download/upload access to various repositories or other CXM components that can provide such functionality, and suggestion provider 405 is connection service to the CXM engine that can provides a list of suggested documents and folders. Suggestion provider 405 also receives keywords from the CXM Engine, which it sends to the search service provider to receive recommendations from a variety of services (e.g., remote search endpoints 604, local service search provider 602).

Windows client sidebar 608 is a sidebar which allows a user to easily get results related to their context with a simple shortcut. It also provides relevant documents to a user's context, but is used differently than the virtual file system as it is quicker to get to.

Upload services 403 may upload changes or updates to the files. Download services 607 allow any file to be downloaded (for example, to be opened) from any of the repositories connected to the repository connection services 402.

Local file system services 551B is a plugin for the repository connection services 402 which can allow for downloading/uploading files to the local file system. SharePoint services 553B is a plugin for the repository connection services 402 which can allow for downloading/uploading files to SharePoint. Shared folder services 555B is a plugin for the repository connection services 402 which can allow for downloading/uploading files to shared folders.

A more detailed version of the virtual drive (N:\) shown in FIG. 1 is depicted in application interface 610. Application 611 (App 1), application 612 (App 2), and so on, to application 613 (App n) are applications which are accessed or manipulated by a user. Windows kernel 614 enable the application interface 610 to interact with hardware devices, and dokan device driver 615 is a Windows user mode file system which works as a proxy and acts like a "pipe" to pass information from a device to a protected portion of a file system (e.g., an OS kernel). As shown in FIG. 6, dokan device driver 615 passes device input to VFS level driver 406. More specifically, dokan device driver 615 includes a library which contains a user mode dynamic-linked library (DLL) and a kernel mode file system driver. Once dokan device driver 615 is installed, file systems for devices can be created which are seen as normal file systems in, e.g., Windows. CXM crawler services 609 may provide additional services for obtaining relevant documents from other repositories not shown in FIG. 6.

Figure 7:
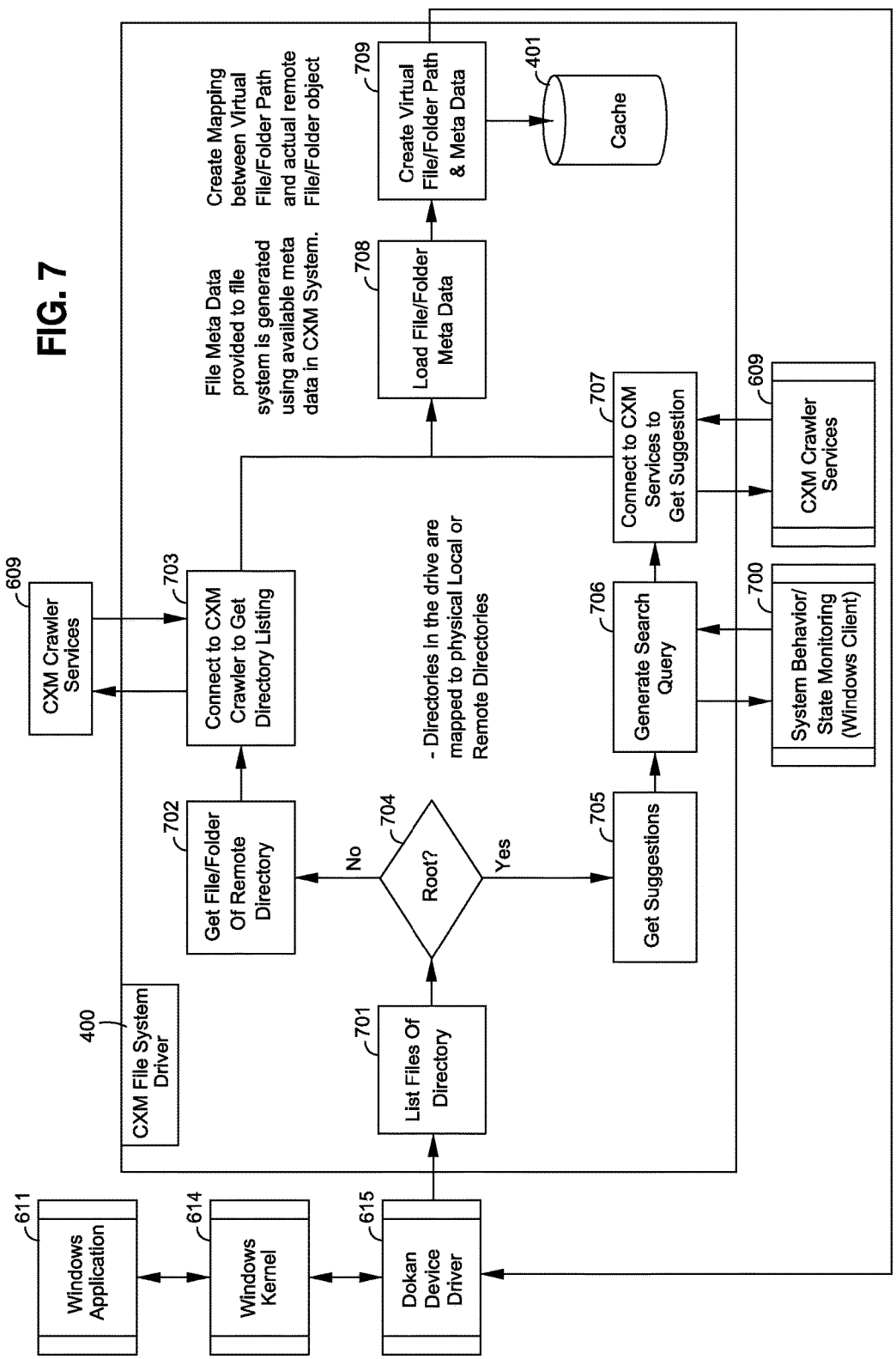
FIG. 7 is a flow diagram for explaining access to root and non-root directories according to an example embodiment.

FIG. 7 is a flow diagram for explaining access to root and non-root directories according to an example embodiment.

Briefly, in FIG. 7, results are received of a first search for files related to a current context of a user of the virtual file system, the files being stored on physical media and/or other virtual file systems. The results of the first search are organized into contextually significant virtual folders in the virtual file system. Responsive to selection of a virtual folder in the virtual file system, a list of files organized in the selected virtual folder according to the first search is displayed. Responsive to selection of a root directory in the virtual file system, results are obtained of a second search for files related to an updated context of the user of the virtual file system, the organization of contextually significant virtual folders is updated, and the updated organization of virtual folders is displayed.

In more detail, in step 701, based on user input obtained via windows application 611, windows kernel 614 and dokan device driver 615, the CXM services perform a first search for files related to a current context of a user of the virtual file system, the files being stored on physical media and/or other virtual file systems. The results of the first search are organized into contextually significant virtual folders in the virtual file system.

In step 704, there is a determination of whether a selected folder is a root folder. The root of the drive may always be the first suggestion returned by CXM services. If the selected directory is not a root directory, then the process proceeds to step 702, whereas if the selected directory is a root directory, the process proceeds to step 705.

In step 702, responsive to selection of a virtual folder in the virtual file system (e.g., not the root folder), a list of files organized in the selected virtual folder according to the first search is displayed. In particular, the file and folder of the remote directory storing the physical file are obtained via the history of path mappings stored in cache 401, and there is a connection to the CXM crawler 609 in step 703 to get the directory listing. The process proceeds to step 708, where the file/folder metadata for a corresponding virtual file is generated using available metadata in the CXM system. In step 709, the path mapping between the actual remote file/folder object (the physical file) and the virtual file/folder path and metadata is created or updated, and stored in cache 401.

Returning to step 702, responsive to selection of a root directory, results are obtained of a second search for files related to an updated context of the user of the virtual file system, the organization of contextually significant virtual folders is updated, and the updated organization of virtual folders is displayed.

In more detail, in step 705, suggestions are obtained from user actions and context. In particular, as mentioned above, VFS level driver 406 monitors which applications are open, titles of open windows a files, what files applications are accessing, and so on. VFS level driver 406 can then determine which are being accessed the most, and can extract keywords related to those applications/files/etc.to send as a query to CXM services.

Thus, in step 706, a search query is generated using, for example, system behavior and state/monitoring information obtained by VFS level driver 406 via, for example, a windows client, and in step 707, there is a connection to CXM services to get suggestions from, for example, CXM crawler services 609. The process proceeds to step 708, where the file/folder metadata for the virtual files or folders is generated using available metadata in the CXM system. In step 709, the path mapping between the actual remote file/folder object (the physical file) and the virtual file/folder path and metadata is created or updated, and stored in cache 401.

Figure 8:
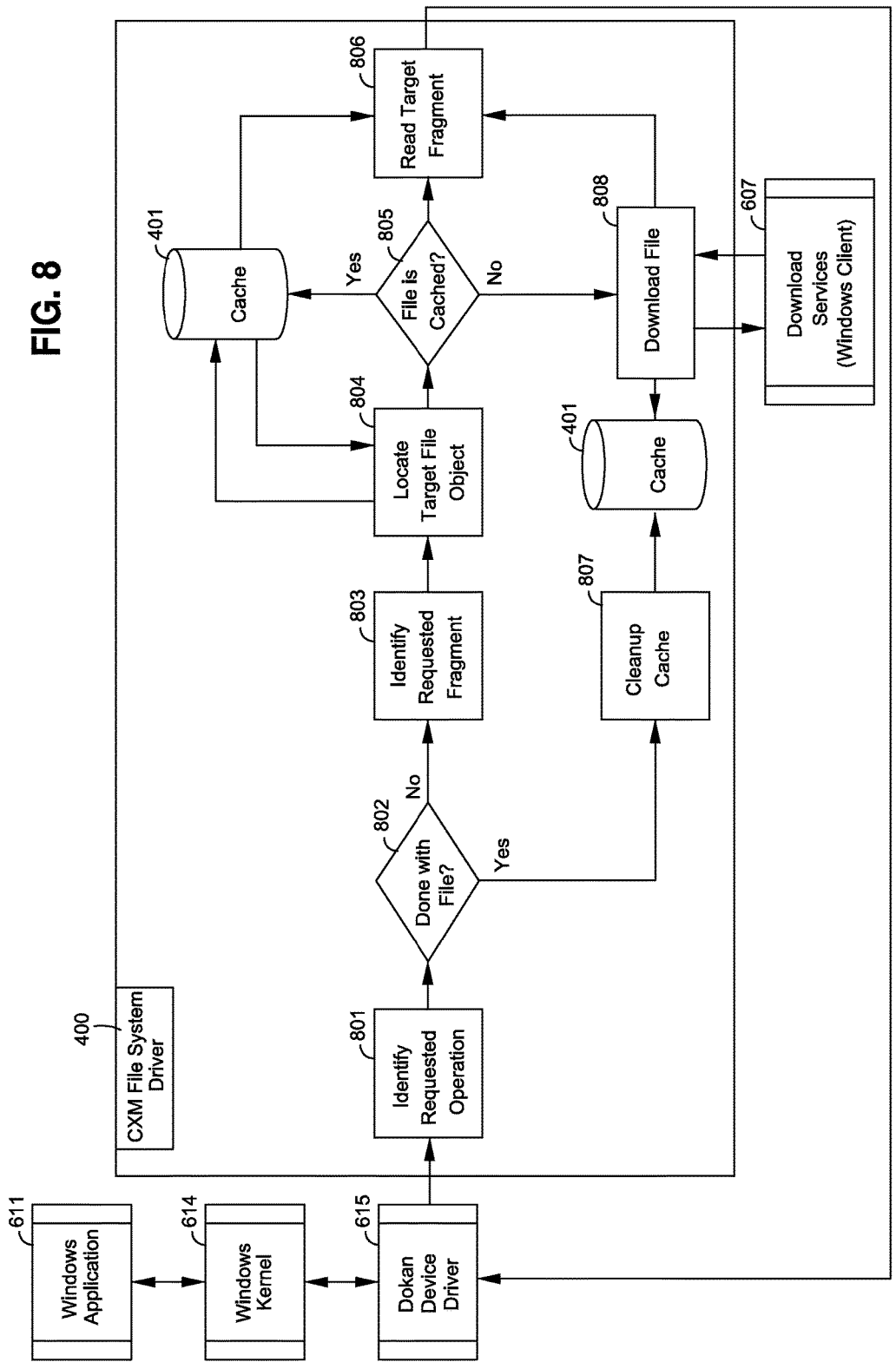
FIG. 8 is a flow diagram for explaining a virtual file system data access/read flow according to an example embodiment.

FIG. 8 is a flow diagram for explaining a virtual file system data access/read flow according to an example embodiment.

In step 801, the requested operation (read/access/etc.) is determined based on user input obtained via windows application 611, windows kernel 614 and dokan device driver 615. In step 802, there is a determination of whether the user is done with the file. If not, the process proceeds to step 803.

In step 803, a requested fragment of a file is identified, and in step 804, there is an attempt to locate the target file object by consulting cache 401. In step 805, there is a determination of whether the file is cached. If so, the process proceeds to step 806 to read the target fragment from the cache 401, and the process returns to wait for further user input. If the file is not cached, the file is downloaded from an external source via download services 607 and stored in the cache 401.

If, on the other hand, the user is determined to be done with the file in step 802, the process proceeds to step 807, where a cleanup process is performed on cache 401. Specifically, the cleanup process discards old files in the cache, as discussed above with respect to FIG. 4.

Figure 9:
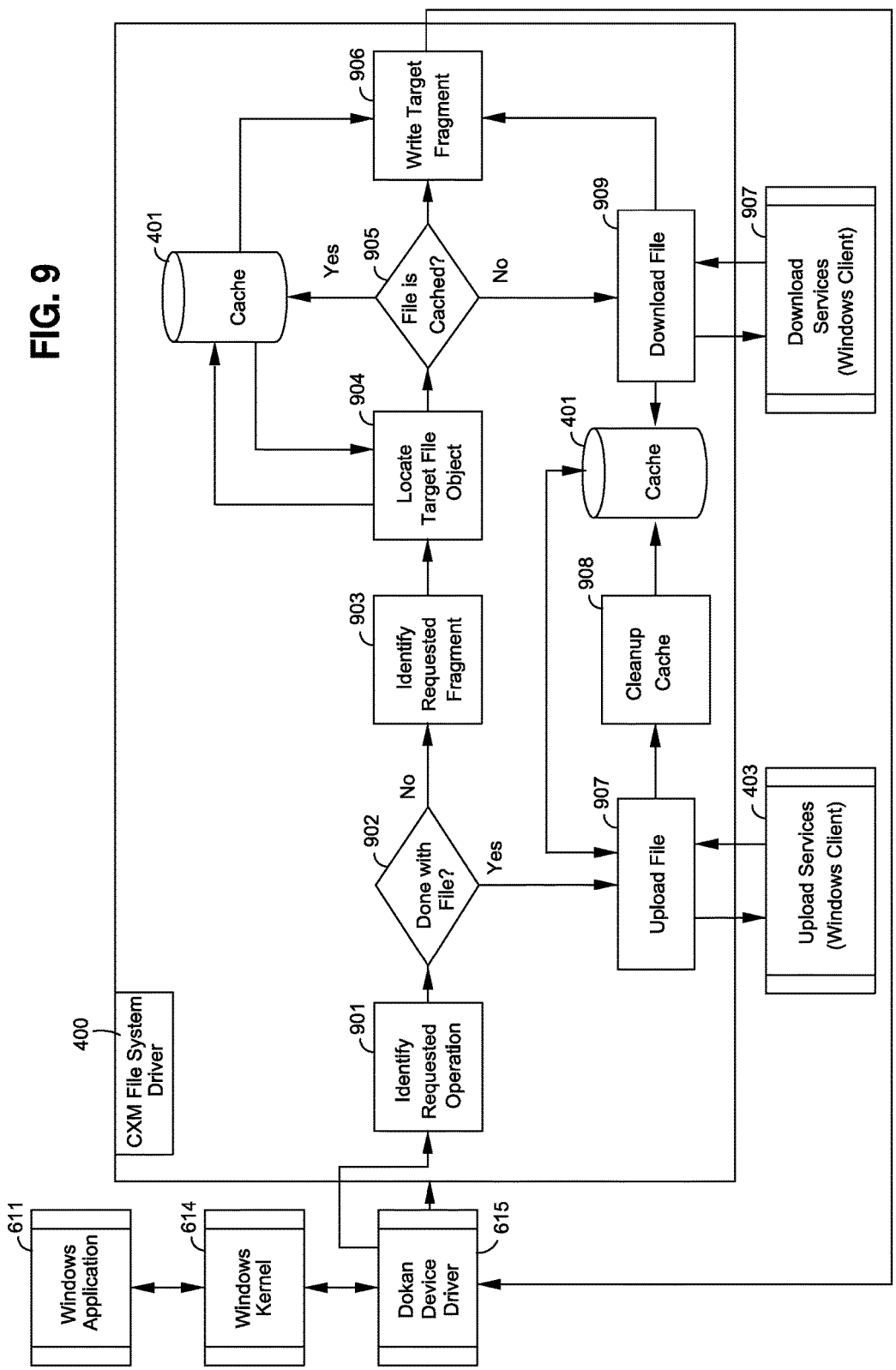
FIG. 9 is a flow diagram for explaining a virtual file system data access/write flow according to an example embodiment.

FIG. 9 is a flow diagram for explaining a virtual file system data access/write flow according to an example embodiment.

In step 901, the requested operation (read/access/etc.) is determined based on user input obtained via windows application 611, windows kernel 614 and dokan device driver 615. In step 902, there is a determination of whether the user is done with the file. If not, the process proceeds to step 903.

In step 903, the requested fragment of the file is identified, and in step 904, there is an attempt to locate the target file object by consulting cache 401. In step 905, there is a determination of whether the file is cached. If so, the process proceeds to step 906 to write the target fragment to the cache 401, and the process returns to wait for further user input. If the file is not cached, the file is downloaded in step 909 from an external source via download services 907 and stored in the cache 401.

If, on the other hand, the user is determined to be done with the file in step 902, the written (e.g. updated) file is written back to the original physical location in step 907 via upload services 403, and the process proceeds to step 908 to cleanup the cache 401.

Other Embodiments

According to other embodiments contemplated by the present disclosure, example embodiments may include a computer processor such as a single core or multi-core central processing unit (CPU) or micro-processing unit (MPU), which is constructed to realize the functionality described above. The computer processor might be incorporated in a stand-alone apparatus or in a multi-component apparatus, or might comprise multiple computer processors which are constructed to work together to realize such functionality. The computer processor or processors execute a computer-executable program (sometimes referred to as computer-executable instructions or computer-executable code) to perform some or all of the above-described functions. The computer-executable program may be pre-stored in the computer processor(s), or the computer processor(s) may be functionally connected for access to a non-transitory computer-readable storage medium on which the computer-executable program or program steps are stored. For these purposes, access to the non-transitory computer-readable storage medium may be a local access such as by access via a local memory bus structure, or may be a remote access such as by access via a wired or wireless network or Internet. The computer processor(s) may thereafter be operated to execute the computer-executable program or program steps to perform functions of the above-described embodiments.

According to still further embodiments contemplated by the present disclosure, example embodiments may include methods in which the functionality described above is performed by a computer processor such as a single core or multi-core central processing unit (CPU) or micro-processing unit (MPU). As explained above, the computer processor might be incorporated in a stand-alone apparatus or in a multi-component apparatus, or might comprise multiple computer processors which work together to perform such functionality. The computer processor or processors execute a computer-executable program (sometimes referred to as computer-executable instructions or computer-executable code) to perform some or all of the above-described functions. The computer-executable program may be pre-stored in the computer processor(s), or the computer processor(s) may be functionally connected for access to a non-transitory computer-readable storage medium on which the computer-executable program or program steps are stored. Access to the non-transitory computer-readable storage medium may form part of the method of the embodiment. For these purposes, access to the non-transitory computer-readable storage medium may be a local access such as by access via a local memory bus structure, or may be a remote access such as by access via a wired or wireless network or Internet. The computer processor(s) is/are thereafter operated to execute the computer-executable program or program steps to perform functions of the above-described embodiments.

The non-transitory computer-readable storage medium on which a computer-executable program or program steps are stored may be any of a wide variety of tangible storage devices which are constructed to retrievably store data, including, for example, any of a flexible disk (floppy disk), a hard disk, an optical disk, a magneto-optical disk, a compact disc (CD), a digital versatile disc (DVD), micro-drive, a read only memory (ROM), random access memory (RAM), erasable programmable read only memory (EPROM), electrically erasable programmable read only memory (EEPROM), dynamic random access memory (DRAM), video RAM (VRAM), a magnetic tape or card, optical card, nanosystem, molecular memory integrated circuit, redundant array of independent disks (RAID), a non-volatile memory card, a flash memory device, a storage of distributed computing systems and the like. The storage medium may be a function expansion unit removably inserted in and/or remotely accessed by the apparatus or system for use with the computer processor(s).

This disclosure has provided a detailed description with respect to particular representative embodiments. It is understood that the scope of the appended claims is not limited to the above-described embodiments and that various changes and modifications may be made without departing from the scope of the claims.

What is claimed is:

1. A method for a virtual file system executed by a computer, wherein the virtual file system simulates physical files stored on other repositories of other computers as files which are accessible locally for a user, the method comprising:
   receiving a request for a file operation to a file in the virtual file system from an application interface on a hardware device of a computer via a proxy driver;
   performing, by a context management system driver different from an application including the application interface, a context management service in response to a reception of the request,
   wherein the context management service of the context management system driver includes:
   receiving results of a first search for files related to current context of the user,
   organizing the results of the first search into a virtual folder of the virtual file system,
   recording entries into a history of path mappings, wherein the path mappings map a location of the virtual folder to locations of the files, corresponding to the result of the first search, and wherein the history of path mappings is recorded onto physical media,
   determining whether the virtual folder is or is not a root,
   further receiving, responsive to a determination that the virtual folder is a root, a result of a second search for files related to another current context, the files being stored on a repository of physical media of said other computers connected with the virtual file system,
   updating the result of the second search into the virtual folder related to the result of the first search, and
   further recording entries into the history of path mappings which map the location of the virtual folder to locations of the files, corresponding to the result of the second search, on the physical media.

2. The method according to claim 1, further comprising:
   monitoring the current context including at least user behavior correlated over time, wherein
   the second search is performed based on the updated current context of the user according to the monitoring.

3. The method according to claim 2, wherein the monitoring is performed based on keywords related to an application being used by the user and text information of a file accessed by the application.

4. The method according to claim 1, further comprising:
resolving a path of the selected file to a physical location on the repository of the physical media by reference to an entry recoded in the history of the path mappings corresponding to a time when the file operation request was received.

* * * * *